(12) United States Patent
Hayashi

(10) Patent No.: US 7,932,197 B2
(45) Date of Patent: *Apr. 26, 2011

(54) OPTICAL GLASS, PRECISION PRESS-MOLDING PREFORM, PROCESS FOR PRODUCTION THEREOF, OPTICAL ELEMENT AND PROCESS FOR THE PRODUCTION THEREOF

(75) Inventor: Kazutaka Hayashi, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,235

(22) Filed: Oct. 8, 2009

(65) Prior Publication Data

US 2010/0035744 A1     Feb. 11, 2010

Related U.S. Application Data

(60) Division of application No. 12/007,081, filed on Jan. 7, 2008, now Pat. No. 7,622,409, which is a continuation of application No. 11/065,279, filed on Feb. 25, 2005, now abandoned.

(30) Foreign Application Priority Data

Mar. 2, 2004 (JP) .................................. 2004-057925

(51) Int. Cl.
*C03C 3/15*     (2006.01)
*C03C 3/155*    (2006.01)
*C03C 3/068*    (2006.01)
(52) U.S. Cl. ................. 501/50; 501/51; 501/78; 501/79
(58) Field of Classification Search ............... 501/50, 501/51, 78, 79
See application file for complete search history.

(56) References Cited

U.S. PATENT DOCUMENTS

| | | | |
|---|---|---|---|
| 3,958,999 A | 5/1976 | Izumitani et al. | |
| 6,187,702 B1 | 2/2001 | Morishita | |
| 7,138,349 B2 | 11/2006 | Uehara et al. | |
| 7,622,409 B2* | 11/2009 | Hayashi | 501/50 |
| 7,655,585 B2* | 2/2010 | Hayashi | 501/51 |
| 2003/0211929 A1 | 11/2003 | Hayashi et al. | |
| 2006/0105900 A1 | 5/2006 | Kasuga et al. | |
| 2006/0189473 A1 | 8/2006 | Endo | |
| 2007/0049483 A1 | 3/2007 | Hayashi | |

FOREIGN PATENT DOCUMENTS

| | | |
|---|---|---|
| CN | 1445188 A | 10/2003 |
| JP | 59-13647 | 1/1984 |
| JP | 9-278480 | 10/1997 |
| JP | 2003252647 | 9/2003 |
| JP | 2004175632 | 6/2004 |

OTHER PUBLICATIONS

Calculations of Physical Properties of Oxide Glasses, pp. 189-191 (and English translation).

* cited by examiner

*Primary Examiner* — Karl E Group
(74) *Attorney, Agent, or Firm* — Nixon & Vanderhye P.C.

(57) ABSTRACT

Provided is an optical glass having high-refractivity low-dispersion properties, having a low glass transition temperature and having the property of being softened at a low temperature so that a preform therefrom is precision press-moldable, and the optical glass comprises, as essential components, $B_2O_3$, $La_2O_3$, $Gd_2O_3$ and ZnO and has a refractive index (nd) of over 1.86, an Abbe's number (vd) of less than 35 and a glass transition temperature (Tg) of 630° C. or lower.

9 Claims, 1 Drawing Sheet

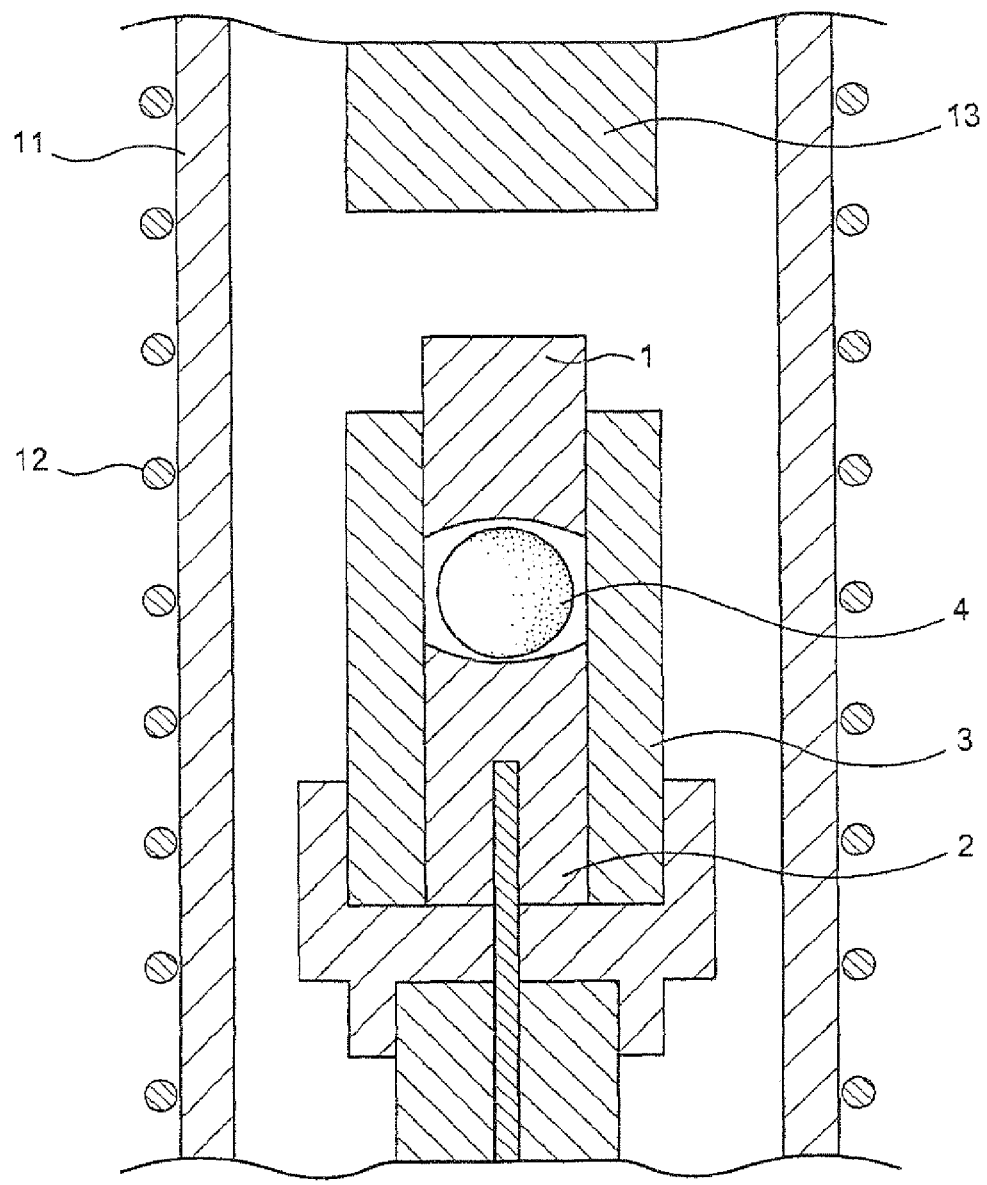

OPTICAL GLASS, PRECISION PRESS-MOLDING PREFORM, PROCESS FOR PRODUCTION THEREOF, OPTICAL ELEMENT AND PROCESS FOR THE PRODUCTION THEREOF

This application is a divisional application of application Ser. No. 12/007,081 filed Jan. 7, 2008, now U.S. Pat. No. 7,622,409, which in turn is a continuation of application Ser. No. 11/065,279 filed Feb. 25, 2005, now abandoned, which in turn claims priority of Japanese application Serial No. 2004-57925 filed Mar. 2, 2004, the entire content of each of which is hereby incorporated by reference in this application.

FIELD OF THE INVENTION

The present invention relates to an optical glass, a precision press-molding preform formed of the above glass, a process for the production of the preform, an optical element formed of the above optical glass and a process for the production of the optical element.

TECHNICAL BACKGROUND

A high-refractivity low-dispersion glass is in great demand as a material for optical elements such as various lenses. As a glass having such optical constants, a dense tantalum flint glass TaSF17 is known, which is described in "Glass Composition Hand Book" (Hiroshi Ogawa and Shin-ei Ogawa, issued by Japan Glass Product Industrial Society, 1991, page 106).

In recent years, with the rapid spread of digital cameras and video cameras, the demand for glass lenses as parts therefor continues to expand. On the other hand, with an increase in the number of pixels of imaging device in digital cameras, optical elements such as glass lenses are required to have high performances, and it is demanded to readily supply optical elements having high form accuracy.

As a method for highly productively supplying optical elements formed of a glass having high form accuracy, a precision press-molding method is known. However, conventional glasses such as TaSF17 and NbSF32 have high glass transition temperatures and are not suitable for precision press-molding.

SUMMARY OF THE INVENTION

It is a first object of the present invention to provide an optical glass which overcomes the above problem of the conventional glasses, which has a high refractive index and low dispersion and has a low glass transition temperature and which has the property of being softened at a low temperature so that a preform formed therefrom is precision press-moldable.

It is a second object of the present invention to provide a precision press-molding preform formed of the above optical glass that accomplishes the above first object, and it is a third object of the present invention to provide a process for the production thereof.

Further, it is a fourth object of the present invention to provide an optical element formed of the optical glass that accomplishes the above first object, and it is a fifth object of the present invention to provide a process for the production thereof.

According to the present invention, the above first to fifth objects of the present invention are achieved, and there are provided;

(1) an optical glass comprising, as essential components, $B_2O_3$, $La_2O_3$, $Gd_2O_3$ and ZnO and having a refractive index (nd) of over 1.86, an Abbe's number (vd) of less than 35 and a glass transition temperature (Tg) of 630° C. or lower, (2) an optical glass comprising, by mol %,

| | |
|---|---|
| 15-45% | $B_2O_3$, |
| 5-20% | $La_2O_3$, |
| 1-20% | $Gd_2O_3$, |
| 10-45% | ZnO, |
| 0-15% | $WO_3$, |
| 0-10% | $Ta_2O_5$, |
| 0-10% | $Nb_2O_5$, |
| 0-20% | $TiO_2$, |
| 0-20% | $SiO_2$, |
| 0-15% | $Li_2O$, |
| 0-10% | $Na_2O$, |
| 0-10% | $K_2O$, |
| 0-10% | MgO, |
| 0-10% | CaO, |
| 0-10% | SrO, |
| 0-10% | BaO |
| 0-8% | $Y_2O_3$, |
| 0-8% | $Yb_2O_3$, | provided that the total content of $La_2O_3$, $Gd_2O_3$, $Y_2O_3$ and $Yb_2O_3$ is 10 to 30%,

| | |
|---|---|
| 0-10% | $ZrO_2$, |
| 0-10% | $Bi_2O_3$, and |
| 0-1% | $Sb_2O_3$, | and having a refractive index (nd) of over 1.86, an Abbe's number (vd) of less than 35 and a glass transition temperature (Tg) of 630° C. or lower, (3) an optical glass comprising, by mol %,

| | |
|---|---|
| 15-45% | $B_2O_3$, |
| 5-20% | $La_2O_3$, |
| 1-20% | $Gd_2O_3$, |
| 10-45% | ZnO, |
| 0-15% | $WO_3$, |
| 0-10% | $Ta_2O_5$, |
| 0-10% | $Nb_2O_5$, |
| 0-20% | $TiO_2$, |
| 0-20% | $SiO_2$, |
| 0-15% | $Li_2O$, |
| 0-10% | $Na_2O$, |
| 0-10% | $K_2O$, |
| 0-10% | MgO, |
| 0-10% | CaO, |
| 0-10% | SrO, |
| 0-10% | BaO |
| 0-8% | $Y_2O_3$, |
| 0-8% | $Yb_2O_3$, | provided that the total content of $La_2O_3$, $Gd_2O_3O_3$, $Y_2O_3$ and $Yb_2O_3$ is 10 to 30%,

| | |
|---|---|
| 0-less than 0.5% | $ZrO_2$, |
| 0-10% | $Bi_2O_3$, and |
| 0-1% | $Sb_2O_3$, | and having a refractive index (nd) of over 1.86, an Abbe's number (vd) of 35 to less than 39.5 and a glass transition temperature (Tg) of 630° C. or lower, (4) a precision press-molding preform, which is formed of the optical glass recited in any one of the above (1) to (3), (5) a process for the production of a precision press-molding preform, which comprises separating a molten glass gob having a predetermined weight from a molten glass flowing out of a pipe, and shaping the glass gob into a preform formed of the optical glass recited in any one of the above (1) to (3), (6) a process for the production of a precision press-molding preform, which comprises forming a shaped glass from a molten glass and processing said shaped glass to produce a preform formed of the optical glass recited in any one of the above (1) to (3), (7) an optical element formed of the optical glass recited in any one of the above (1) to (3), (8) a process for the production of an optical element, which comprises heating the preform recited in the above (4) and precision press-molding the preform, (9) a process for the production of an optical element, which comprises heating the preform produced by the process recited in the above (5) or (6) and precision press-molding the preform,

(10) a process for the production of an optical element as recited in the above (8) or (9), wherein a press mold and the preform are heated together and the preform is precision press-molded with said press mold, and

(11) a process for the production of an optical element as recited in the above (8) or (9), wherein the preform pre-heated separately from a press mold is introduced into the press mold pre-heated, and the preform is precision press-molded.

EFFECT OF THE INVENTION

According to the present invention, there can be obtained an optical glass which has a high refractive index and low dispersion and has a low glass transition temperature and which has the property of being softened at a low temperature so that a preform formed therefrom is precision press-moldable, and there can be obtained a precision press-molding preform formed of the above optical glass and an optical element which is formed of the above optical glass.

BRIEF DESCRIPTION OF DRAWINGS

The figure is a schematic drawing of a precision press-molding apparatus used in Examples of the present invention.

PREFERRED EMBODIMENTS OF THE INVENTION

The optical glass of the present invention will be explained first.

The optical glass of the present invention includes three embodiments of the optical glass. According to a first embodiment of the present invention, the optical glass characteristically comprises $B_2O_3$, $La_2O_3$, $Gd_2O_3$ and ZnO as essential components and has a refractive index (nd) of over 1.86, an Abbe's number (vd) of less than 35 and a glass transition temperature (Tg) of 630° C. or lower.

In the optical glass according to the first embodiment of the present invention, $B_2O_3$ is an essential component for constituting a glass network, and $La_2O_3$ and $Gd_2O_3$ are essential components for imparting the optical glass with high-refractivity low-dispersion properties. When these two components are co-present, the glass is more improved in stability.

ZnO is an essential component for imparting the glass with the property of being softened at a low temperature without decreasing the refractive index.

The optical glass according to the first embodiment of the present invention contains the above essential components, so that it has optical properties represented by a refractive index (nd) of over 1.86, preferably 1.861 or more and an Abbe's number (vd) of less than 35, preferably 25 to less than 35, and that it has high glass stability and the property of being softened at a low temperature as is suitable for precision press-molding, or a glass transition temperature (Tg) of 630° C. or lower, preferably 620° C. or lower, more preferably less than 600° C.

The optical glass according to a second embodiment of the present invention will be explained below.

The optical glass according to the second embodiment of the present invention is included in (or a variant of) the above optical glass according to the first embodiment of the present invention, and the optical glass according to the second embodiment of the present invention comprises, by mol %,

| | |
|---|---|
| 15-45% | $B_2O_3$, |
| 5-20% | $La_2O_3$, |
| 1-20% | $Gd_2O_3$, |
| 10-45% | ZnO, |
| 0-15% | $WO_3$, |
| 0-10% | $Ta_2O_5$, |
| 0-10% | $Nb_2O_5$, |
| 0-20% | $TiO_2$, |
| 0-20% | $SiO_2$, |
| 0-15% | $Li_2O$, |
| 0-10% | $Na_2O$, |
| 0-10% | $K_2O$, |
| 0-10% | MgO, |
| 0-10% | CaO, |
| 0-10% | SrO, |
| 0-10% | BaO |
| 0-8% | $Y_2O_3$, |
| 0-8% | $Yb_2O_3$, | provided that the total content of $La_2O_3$, $Gd_2O_3$, $Y_2O_3$ and $Yb_2O_3$ is 10 to 30%,

| | |
|---|---|
| 0-10% | $ZrO_2$, |
| 0-10% | $Bi_2O_3$, and |
| 0-1% | $Sb_2O_3$, | and has a refractive index (nd) of over 1.86, an Abbe's number (vd) of less than 35 and a glass transition temperature (Tg) of 630° C. or lower.

The reason for the limitation of the compositional ranges of the optical glass according to the second embodiment of the present invention will be explained bellow. In the following explanation, "%" stands for "mol %" unless otherwise specified.

$B_2O_3$ is an essential component for forming the glass network. When it is introduced to excess, the refractive index (nd) of the glass is decreased, so that the content thereof is 15 to 45%. The content of $B_2O_3$ is preferably 18 to 43%, more preferably 20 to 40%.

$La_2O_3$ is an essential component for imparting the glass with high-refractivity low-dispersion properties. When it is introduced to excess, the stability of the glass is decreased, so that the content thereof is 5 to 20%. The content of $La_2O_3$ is preferably 6 to 19%, more preferably 7 to 18%.

$Gd_2O_3$ is also an essential component for imparting the glass with high-refractivity low-dispersion properties. When it is introduced to excess, however, the glass stability is decreased, so that the content thereof is 1 to 20%. As is already explained, $Gd_2O_3$, being co-present with $La_2O_3$, has the effect of improving the glass stability more than it is present alone. The content of $Gd_2O_3$ is preferably 1 to 18%, more preferably 1 to 16%.

ZnO is an essential component for imparting the glass with the property of being softened at a low temperature while maintaining the high-refractivity. However, when it is introduced to excess, the glass is degraded in stability, so that the content thereof is adjusted to 10 to 45%. The content of ZnO is preferably 12 to 43%, more preferably 15 to 40%.

$WO_3$ works to improve the glass stability and decrease the liquidus temperature of the glass. However, when it is introduced to excess, the glass is degraded in stability and is colored, so that the content of $WO_3$ is adjusted to 0 to 15%. The content of $WO_3$ is preferably 1 to 15%, more preferably 2 to 13%.

$Ta_2O_5$ is a component for increasing the refractive index of the glass. However, when it is introduced to excess, the glass is degraded in stability, so that the content thereof is adjusted to 0 to 10%. The content of $Ta_2O_5$ is preferably 0 to 8%, more preferably 0 to 7%.

$Nb_2O_5$ is also a component for increasing the refractive index of the glass. However, when it is introduced to excess, the glass is degraded in stability, and the liquidus temperature of the glass is increased, so that the content thereof is adjusted to 0 to 10%. The content of $Nb_2O_5$ is preferably 0 to 8%, more preferably 0 to 7%.

$TiO_2$ is also a component for increasing the refractive index of the glass. However, when it is introduced to excess, the glass is degraded in stability and is also colored, so that the content thereof is adjusted to 0 to 20%. The content of $TiO_2$ is preferably 0 to 19%, more preferably 1 to 18%. For increasing the refractive index of the glass, the total content of $WO_3$, $Ta_2O_5$, $Nb_2O_5$ and $TiO_2$ is adjusted preferably to over 10% by weight, more preferably to 11% by weight or more, particularly preferably to 12% by weight or more.

$SiO_2$ works to improve the glass in stability. However, when it is introduced to excess, the refractive index of the glass is decreased, and the glass transition temperature is increased. The content thereof is therefore adjusted to 0 to 20%. The content of $SiO_2$ is preferably 0 to 15%, more preferably 0 to 10%.

For attaining higher refractivity while the glass has an Abbe's number (vd) of less than 35 but satisfies various conditions required of the glass, preferably, the molar ratio of the content of $B_2O_3$ to the total content of $B_2O_3$ and $SiO_2$ ($B_2O_3/(B_2O_3+SiO_2)$) is adjusted to from 0.80 to 1.00, more preferably to from 0.82 to 1.00.

$Li_2O$ highly effectively decreases the glass transition temperature. However, when it is introduced to excess, the refractive index of the glass is decreased, and the glass is also degraded in stability. It is therefore preferred to adjust the content of $Li_2O$ to 0 to 15%. When priority is given to imparting the glass with the property of being softened at a low temperature, it is more preferred to adjust the content thereof to 0.1 to 15%. Further, when priority is given to the property of high refractivity, $Li_2O$ may not be introduced. It can be therefore determined depending upon purposes whether or not $Li_2O$ is to be introduced.

$Na_2O$ and $K_2O$ work to improve the glass in meltability. However, when they are introduced to excess, the glass is degraded in refractivity and stability, so that the content of each of these is adjusted to 0 to 10%. The content of each of these is preferably 0 to 8%, more preferably 0 to 6%.

MgO, CaO and SrO also work to improve the glass in meltability. However, when they are introduced to excess, the glass is degraded in refractivity and stability, so that the content of each of these is adjusted to 0 to 10%. The content of each of these is preferably 0 to 8%, more preferably 0 to 6%.

BaO works to increase the refractive index of the glass. However, when it is introduced to excess, the glass is degraded in stability, so that the content thereof is adjusted to 0 to 10%. The content of BaO is preferably 0 to 8%, more preferably 0 to 6%.

$Y_2O_3$ and $Yb_2O_3$ work to impart the glass with the properties of high-refractivity and low-dispersion. However, when they are introduced to excess, the glass is degraded in stability, so that the content thereof is adjusted to 0 to 8%. The content of each of these is preferably 0 to 7%, more preferably 0 to 6%. When being co-present with $La_2O_3$, $Y_2O_3$ and $Yb_2O_3$ work to promote the improvement of the glass in stability.

For imparting the glass with high refractivity but impairing no glass stability, preferably, the total content of rare earth oxides in the glass is adjusted to 10 to 30 mol %. However, it is preferred to preclude $Lu_2O_3$, since $Lu_2O_3$ is an expensive component. For imparting the glass with the predetermined optical constants and stability, the total content of $La_2O_3$, $Gd_2O_3$, $Y_2O_3$ and $Yb_2O_3$ is adjusted to 10 to 30%. The above total content is preferably 11 to 28%, more preferably 12 to 24%.

$ZrO_2$ works to increase the refractive index of the glass. However, when it is introduced to excess, the glass is degraded in stability, and the liquidus temperature of the glass is increased, so that the content thereof is adjusted to 0 to 10%. The content of $ZrO_2$ is preferably 0 to 9%, more preferably 0 to 8%.

For maintaining the glass stability and attaining the high refractivity of the glass at the same time, preferably, the total content of $WO_3$, $Ta_2O_5$, $Nb_2O_5$, $TiO_2$ and $ZrO_2$ is adjusted to 2 to 40 mol %, more preferably, to 5 to 35 mol %.

$Bi_2O_3$ works to increase the refractive index of the glass and improve the glass in stability. However, when it is introduced to excess, the glass is colored, so that the content thereof is adjusted to 0 to 10%. The content of $Bi_2O_3$ is preferably 0 to 8%, more preferably 0 to 5%.

For achieving the object of the present invention and improving the glass more in the above properties, the total content of the above glass components including a refining agent is adjusted to over 95%, more preferably to over 98%, still more preferably to over 99%, and particularly preferably to 100%.

$GeO_2$ and $Ga_2O_3$ work to increase the refractive index of the glass and improve the glass in stability. Since, however, they are expensive components, it is preferred to adjust the content of each of these to 0 to 10%, more preferably to 0 to 1%, and it is still more preferred to introduce none of these.

In addition to the above components, a refining agent may be added in a total amount of 0 to 1%. When a refining-agent is added to excess, the molding surface of a press mold, particularly a mold release film, may be damaged during precision press-molding. It is therefore required to be careful in adding the refining agent.

The refining agent can be selected, for example, from $Sb_2O_3$ or $As_2O_3$. In view of environmental concerns, it is imperative to avoid the use of $As_2O_3$. The content of $Sb_2O_3$ is preferably 0 to 1%.

F can be introduced as well. When a molten glass is shaped during melting the glass containing F, however, F is volatilized from the glass to cause the occurrence of striae and make the optical constants vary, so that it is preferred not to introduce F.

Besides these, it is imperative to avoid the introduction of PbO in view of its detrimental effects on the environment and since it is reduced to adhere to the molding surface of a press mold during precision press-molding in a non-oxidizing atmosphere.

Apart from coloring the glass in order to impart the glass with the capability of absorbing light having a specific wavelength, desirably, Cu, Fe, Cr, etc., are not introduced. Desirably, Cd is not introduced.

Like the optical glass according to the first embodiment of the present invention, the optical glass according to the second embodiment of the present invention has optical properties represented by a refractive index (nd) of over 1.86, preferably 1.861 or more and an Abbe's number (vd) of less than 35, preferably 25 to less than 35, and it has high glass stability and the property of being softened at a low temperature as is suitable for precision press-molding, or a glass transition temperature (Tg) of 630° C. or lower, preferably 620° C. or lower, more preferably less than 600° C.

The optical glass according to a third embodiment of the present invention comprises, by mol %,

| | |
|---|---|
| 15-45% | $B_2O_3$, |
| 5-20% | $La_2O_3$, |
| 1-20% | $Gd_2O_3$, |
| 10-45% | ZnO, |
| 0-15% | $WO_3$, |
| 0-10% | $Ta_2O_5$, |
| 0-10% | $Nb_2O_5$, |
| 0-20% | $TiO_2$, |
| 0-20% | $SiO_2$, |
| 0-15% | $Li_2O$, |
| 0-10% | $Na_2O$, |
| 0-10% | $K_2O$, |
| 0-10% | MgO, |
| 0-10% | CaO, |
| 0-10% | SrO, |
| 0-10% | BaO |
| 0-8% | $Y_2O_3$, |
| 0-8% | $Yb_2O_3$, | provided that the total content of $La_2O_3$, $Gd_2O_3$, $Y_2O_3$ and $Yb_2O_3$ is 10 to 30%,

| | |
|---|---|
| 0-less than 0.5% | $ZrO_2$, |
| 0-10% | $Bi_2O_3$, and |
| 0-1% | $Sb_2O_3$, | and has a refractive index (nd) of over 1.86, an Abbe's number (vd) of 35 to less than 39.5 and a glass transition temperature (Tg) of 630° C. or lower.

The optical glass according to the third embodiment of the present invention differs from the optical glass according to the second embodiment of the present invention only in that the content of $ZrO_2$ in the glass composition is 0 to less than 0.5 mol %.

For reasons for limitations to the compositional ranges of those oxides other than $ZrO_2$ in the optical glass according to the third embodiment of the present invention, it is requested that explanations with regard to the optical glass according to the second embodiment of the present invention be referred to. Therefore, only the reason for the limitation to the compositional range of $ZrO_2$ will be discussed below.

While $ZrO_2$ is one of components that impart the glass with the properties of high-refractivity and low-dispersion, it also works to increase the liquidus temperature of the glass.

For obtaining an optical glass having the property of relatively low dispersion represented by an Abbe's number (vd) of less than 35, it is required to add a large amount of rare earth components such as $La_2O_3$, $Gd_2O_3$, and the like. The rare earth components such as $La_2O_3$, $Gd_2O_3$, and the like are also components that increase the liquidus temperature. When $ZrO_2$ is added to a glass containing a large amount of the above rare earth components, the liquidus temperature of the glass is further increased, so that the viscosity of the glass during shaping is decreased, which impairs the shapeability.

When the Abbe's number (vd) is required to be less than 35, therefore, it is preferred to adjust the content of $ZrO_2$ to less than 0.5 mol %, and it is more preferred to introduce no $ZrO_2$.

The optical glass according to the third embodiment of the present invention has optical properties represented by a refractive index (nd) of over 1.86, preferably 1.861 or more and an Abbe's number (vd) of 35 to less than 39.5 and has high glass stability and the property of being softened at a low temperature as is suitable for precision press-molding, or a glass transition temperature (Tg) of 630° C. or lower, preferably 620° C. or lower, more preferably less than 600° C.

In the optical glass according to any one of the first to third embodiments of the present invention, the upper limit of the refractive index (nd) is not critical, while the upper limit of the refractive index (nd) is preferably 1.92 or less for obtaining a glass having excellent stability.

The optical glass according to any one of the first to third embodiments of the present invention can be preferably used for producing a precision press-molding preform and for producing an optical element.

The precision press-molding preform of the present invention will be explained below.

The precision press-molding preform (the preform for precision press-molding, to be referred to as "preform" hereinafter), provided by the present invention, is formed of the optical glass according to any one of the first, second and third embodiments of the present invention.

The preform is a shaped glass material having a weight equivalent to the weight of a press-molded product, and it has a proper form to which the optical glass is shaped depending upon the form of a press-molded product. Examples of the form include the form of a sphere, the form of an ellipsoid of revolution, and the like. The preform is heated so as to have a viscosity that permits press-molding, and then subjected to press-molding.

The form of the preform including the above ellipsoid of revolution preferably has one axis of rotation symmetry. The above form having one axis of rotation symmetry includes a form having a smooth contour free of any corner or dent in a cross section including the above axis of rotation symmetry, such as a form having the contour of an ellipse in which the minor axis corresponds to the axis of rotation symmetry in the above cross section. Preferably, when one of angles formed by a line connecting any point on the contour of a preform in the above cross section to the center of the gravity of the preform on the axis of revolution symmetry and a tangent line contacting the contour on the above point on the contour is taken as θ, and when the above point starts at the axis of revolution symmetry and moves along the contour, the angle θ monotonously increases from 90°, then decreases monotonously and then decreases monotonously to come to be 90° at the other point where the contour crosses the axis of revolution symmetry.

The above preform may have a thin film such as a mold release film on its surface as required. Examples of the mold release film include a carbon-containing film and a self-assembled film. The above preform can be press-molded to give an optical element having the predetermined optical constants.

The process for the production of a preform, provided by the present invention, will be explained below.

The process for the production of a preform, provided by the present invention, includes two embodiments of the process. The first embodiment of the process comprises separating a molten glass gob having a predetermined weight from a molten glass flowing out of a pipe and shaping the above glass gob into a preform formed of the optical glass according to the first, second or third embodiment of the present invention.

In the above process, the preform is shaped at a stage when the glass in a molten state is cooled. The glass can be shaped into the preform that can be used as such without processing the glass with a machine after the glass solidifies. The above process has advantages that machine processing procedures such as cutting, grinding and polishing are not required. Further, the preform can be shaped as a preform having a smooth surface. Further, the entire surface is a surface formed by solidification of the glass in a molten state, so that a smooth surface free of fine scratches caused by polishing or latent scratches can be obtained.

The preform surface is preferably free of any cutting mark called "shear mark". The shear mark is generated when a molten glass flowing out of a pipe is cut with a cutting blade. When the shear mark remains at a stage after the preform is precision press-molded, such a mark portion is defective. It is therefore preferred to preclude the shear mark at a stage where the preform is shaped. The method for separating a molten glass gob using no cutting blade so that no shear mark is formed includes a method in which a molten glass is dropped from a flow pipe, or a method in which the forward end portion of a molten glass flow from a flow pipe is supported and the support is removed at a time when a molten glass gob having a predetermined weight can be separated (to be referred to as "descent-separation method"). In the descent-separation method, the molten glass gob is separated at a narrow portion formed between the forward end portion and the flow pipe side portion of the molten glass flow, and the molten glass gob having a predetermined weight can be obtained. Then, while the thus-obtained molten glass gob in a softened state, the molten glass gob is shaped into a form suitable for press-molding, whereby the preform can be obtained.

Preferably, the thus-separated molten glass gob having a predetermined weight is shaped into a preform while the gob is caused to float by applying air (gas) pressure or while the gob is caused to nearly float so that the contact of the gob to a shaping mold is reduced (to be referred to as "float-shaping" hereinafter). Since the float-shaping can decrease a contact between a high-temperature glass and a shaping mold, cracking of the preform can be prevented. Further, a preform of which the entire surface is a free surface can be produced.

The second embodiment of the process comprises forming a shaped glass from a molten glass and processing the above shaped glass to produce a preform formed of the optical glass according to the first, second or third embodiment of the present invention.

The above process may employ a constitution in which a molten glass is cast into a mold (die) to form a shaped glass material formed of the above optical glass and the shaped glass material is processed with a machine to obtain a preform having a predetermined weight. Before processed with a machine, the glass may be annealed to fully remove strains so that the glass is not broken.

In each of the above embodiments of the process, high-quality preforms free of defects such as devitrification, striae, scratches, breaking, etc., can be produced from a glass in a molten state since the optical glass according to any one of the first, second and third embodiments of the present invention has high glass stability.

The optical element of the present invention will be explained below.

The optical element of the present invention has a characteristic feature that it is formed of the optical glass according to any one of the first, second and third embodiments of the present invention. According to the present invention, there can be provided various optical elements based on optical properties that the optical glasses according to the first to third embodiments of the present invention have. Examples of the optical elements include various lenses such as a spherical lens, an aspherical lens, a microlens, etc., a diffraction grating, a lens with a diffraction grating, a lens array, a prism, and the like.

The optical element may be provided with an optical thin film such as an anti-reflection film, a total reflection film, a partial reflection film or a film having spectral characteristics as required.

The process for the production of an optical element, provided by the present invention, will be explained below.

The process for the production of an optical element, provided by the present invention, comprises heating the above preform and precision press-molding the preform.

The above precision press-molding is also called "mold optics molding" and is well known in this art. That surface of an optical element which transmits, refracts, diffracts or reflects light is called "optical-function surface" (for example, an aspherical surface of an aspherical lens or a spherical surface of a spherical lens corresponds to the optical-function surface). According to the precision press-molding, the optical-function surface can be formed by precisely transferring the molding surface of a press mold to a glass, and the processing procedures with a machine such as grinding, polishing, etc., are not required for finishing the optical-function surface.

Therefore, the process for the production of an optical element, provided by the present invention, is suitable for producing a lens, a lens array, a diffracting grating, a prism, etc., and is the most suitable for highly productively producing aspherical lenses.

According to the process for the production of an optical element, provided by the present invention, optical elements having the above optical properties can be produced, each optical glass has a low glass transition temperature (Tg), and the temperature for the press-molding can be therefore decreased, so that damage to the molding surface of a press mold can be reduced and that the lifetime of the press mold can be increased. Further, since the glass constituting the preform has high stability, the devitrification of the glass in re-heating and pressing steps can be effectively prevented. Further, a series of steps starting at melting of the glass and ending with obtaining of a final product can be highly productively carried out.

The press mold for the precision press-molding can be selected from known press molds, such as press molds that are made, as mold materials, from refractory ceramics such as silicon carbide, zirconia, alumina, etc., and have a mold release film on the molding surface of each mold material. Of these, a press mold made of silicon carbide is preferred. The mold release film can be selected from a carbon-containing film, or the like. A carbon film is preferred in view of durability and a cost.

In the precision press-molding, desirably, a non-oxidizing atmosphere is employed as an atmosphere for the precision press-molding for maintaining the molding surface of a press mold in an excellent state. The non-oxidizing gas is preferably selected from nitrogen or a gas mixture of nitrogen with hydrogen.

The precision press-molding for use in the process for the production of an optical element in the present invention includes two embodiments of the process, and the two embodiments will be explained below.

(Precision Press-Molding 1)

The process as a first embodiment comprises heating a press mold and a preform together and pressing the preform with the press mold.

In the precision press-molding 1, preferably, the press mold and the preform are together heated to a temperature at which the glass constituting the preform exhibits a viscosity of $10^6$ to $10^{12}$ dPa·s, followed by precision press-molding.

Further, desirably, a precision press-molded product is cooled to a temperature at which the above glass exhibits a viscosity of $10^{12}$ dPa·s or higher, preferably $10^{14}$ dPa·s or higher, more preferably $10^{16}$ dPa·S or higher before it is taken out of the press mold.

Under the above conditions, the form of molding surface of the press mold can be precisely transferred to the glass, and a precision press-molded product can be taken out of the press mold without any deformation.

(Precision Press-Molding 2)

The process as a second embodiment comprises introducing a preform preheated separately from a press mold into the preheated press mold, and precision press-molding the preform.

According to the precision press-molding 2, the preform is preheated before it is introduced into the press mold, so that optical elements free of surface defects and excellent in surface accuracy can be produced while the cycle time can be decreased.

Preferably, the temperature for preheating the press mold is set at a temperature lower than the temperature for preheating the preform. When the temperature for preheating the press mold is set at a lower temperature as described above, the attrition of the above press mold can be reduced.

In the precision press-molding 2, preferably, the preform is preheated to a temperature at which the glass constituting the preform exhibits a viscosity of $10^9$ dPa·S or less, more preferably less than $10^9$ dPa·S.

Further, preferably, the preform is preheated while it is caused to float. Further, more preferably, the preform is preheated to a temperature at which the glass constituting the preform exhibits a viscosity of $10^{5.5}$ to $10^9$ dPa·S, still more preferably at least $10^{5.5}$ but less than $10^9$ dPa·S.

Further, preferably the cooling of the glass is started concurrently with the start of the pressing or during the pressing.

The temperature of the press mold is adjusted to a temperature lower than the temperature employed for preheating the above preform. The temperature of the press mold can be set approximately at a temperature at which the above glass exhibits a viscosity of $10^9$ to $10^{12}$ dPa·S.

In the above process, preferably, a precision press-molded product is taken out of the press mold after it is cooled to a temperature at which the glass exhibits a viscosity of $10^{12}$ dPa·S or more.

The optical element obtained by the precision press-molding is taken out of the press mold and gradually cooled as required. When the precision press-molded product is an optical element such as a lens, the product is surface-coated with an optical thin film as required.

EXAMPLES

The present invention will be further explained below with reference to Examples.

Oxides, hydroxides, carbonates, nitrates, etc., were used as corresponding raw materials of each glass, these raw materials were weighed so that the composition shown in Tables 1 to 3 was obtained after the formation of the glass, and these raw materials were fully mixed. Then, the mixture was poured into a platinum crucible and melted with stirring in an electric furnace in a temperature range of 1,200 to 1,250° C. in atmosphere for 2 to 4 hours. A homogenized and refined glass melt was cast into a 40×70×15 mm mold made of carbon, and a cast glass was gradually cooled to a transition temperature. Immediately thereafter it was placed in an annealing furnace, and annealed at a temperature around the transition temperature for 1 hour, and in the annealing furnace, it was gradually cooled to room temperature. In this manner, optical glasses were obtained. The optical glasses shown in Tables 1 and 2 correspond to the optical glass according to the first or second embodiment of the present invention, and the glasses shown in Table 3 correspond to the optical glass according to the third embodiment of the present invention.

When the thus-obtained glasses were magnified and observed through a microscope, neither precipitation of a crystal nor a residual non-melted material was observed.

The obtained optical glasses were measured for a refractive index (nd), an Abbe's number (vd), a glass transition temperature (Tg) and a sag temperature as follows, and Tables 1 to 3 show the results.

(1) Refractive index (nd) and Abbe's number (vd)

Optical glass obtained at a gradually cooling rate of −30° C./hour was measured.

(2) Glass transition temperature (Tg) and sag temperature (Ts)

Measured with a thermo-mechanical analyzer supplied by Rigaku Corporation at a temperature elevation rate of 4° C./minute.

TABLE 1

| | | No. | | | | |
|---|---|---|---|---|---|---|
| | | 1 | 2 | 3 | 4 | 5 |
| $B_2O_3$ | mol % | 34.88 | 36.43 | 34.88 | 33.33 | 31.78 |
| | wt % | 17.38 | 18.74 | 17.23 | 15.95 | 14.75 |
| $La_2O_3$ | mol % | 13.95 | 13.18 | 10.85 | 10.85 | 10.85 |
| | wt % | 32.53 | 31.72 | 25.09 | 24.31 | 23.57 |
| $Gd_2O_3$ | mol % | 3.10 | 2.33 | 6.20 | 7.75 | 9.30 |
| | wt % | 8.04 | 6.23 | 15.95 | 19.32 | 22.48 |
| ZnO | mol % | 32.56 | 23.26 | 32.56 | 32.56 | 32.56 |
| | wt % | 18.96 | 13.98 | 18.80 | 18.22 | 17.67 |

TABLE 1-continued

|  |  | No. | | | | |
|---|---|---|---|---|---|---|
|  |  | 1 | 2 | 3 | 4 | 5 |
| $WO_3$ | mol % | 9.30 | 9.30 | 9.30 | 9.30 | 9.30 |
|  | wt % | 15.43 | 15.93 | 15.31 | 14.83 | 14.38 |
| $Ta_2O_5$ | mol % | 0.00 | 0.00 | 0.00 | 0.00 | 0.00 |
|  | wt % | 0.00 | 0.00 | 0.00 | 0.00 | 0.00 |
| $Nb_2O_5$ | mol % | 3.10 | 3.10 | 3.10 | 3.10 | 3.10 |
|  | wt % | 5.90 | 6.09 | 5.85 | 5.67 | 5.50 |
| $TiO_2$ | mol % | 3.10 | 12.40 | 3.10 | 3.10 | 3.10 |
|  | wt % | 1.77 | 7.32 | 1.76 | 1.70 | 1.65 |
| $SiO_2$ | mol % | 0.00 | 0.00 | 0.00 | 0.00 | 0.00 |
|  | wt % | 0.00 | 0.00 | 0.00 | 0.00 | 0.00 |
| $Li_2O$ | mol % | 0.00 | 0.00 | 0.00 | 0.00 | 0.00 |
|  | wt % | 0.00 | 0.00 | 0.00 | 0.00 | 0.00 |
| $Yb_2O_3$ | mol % | 0.00 | 0.00 | 0.00 | 0.00 | 0.00 |
|  | wt % | 0.00 | 0.00 | 0.00 | 0.00 | 0.00 |
| $ZrO_2$ | mol % | 0.00 | 0.00 | 0.00 | 0.00 | 0.00 |
|  | wt % | 0.00 | 0.00 | 0.00 | 0.00 | 0.00 |
| Total | mol % | 100.00 | 100.00 | 100.00 | 100.00 | 100.00 |
|  | wt % | 100.00 | 100.00 | 100.00 | 100.00 | 100.00 |
| (A)※ | mol % | 17.05 | 15.51 | 17.05 | 18.60 | 20.15 |
|  | wt % | 40.57 | 37.95 | 41.04 | 43.63 | 46.05 |
| Tg (° C.) |  | 570 | 591 | 567 | 567 | 567 |
| Ts (° C.) |  | 611 | 631 | 607 | 607 | 607 |
| nd |  | 1.8735 | 1.8979 | 1.8709 | 1.8819 | 1.8929 |
| vd |  | 34.9 | 29.2 | 34.6 | 34.0 | 33.4 |

※(A) represents a total content of $La_2O_3$, $Gd_2O_3$, $Y_2O_3$ and $Yb_2O_3$

TABLE 2

|  |  | No. | | | | | |
|---|---|---|---|---|---|---|---|
|  |  | 6 | 7 | 8 | 9 | 10 | 11 |
| $B_2O_3$ | mol % | 36.43 | 34.35 | 32.82 | 33.83 | 33.83 | 32.33 |
|  | wt % | 18.72 | 17.38 | 16.52 | 17.48 | 17.59 | 17.11 |
| $La_2O_3$ | mol % | 13.18 | 10.69 | 10.69 | 12.03 | 10.53 | 10.53 |
|  | wt % | 31.68 | 25.30 | 25.17 | 29.09 | 25.60 | 26.08 |
| $Gd_2O_3$ | mol % | 2.33 | 4.58 | 4.58 | 3.01 | 4.51 | 6.02 |
|  | wt % | 6.22 | 12.07 | 12.00 | 8.09 | 12.21 | 16.58 |
| ZnO | mol % | 32.56 | 22.90 | 22.90 | 25.56 | 22.56 | 19.55 |
|  | wt % | 19.55 | 13.54 | 13.47 | 15.44 | 13.70 | 12.10 |
| $WO_3$ | mol % | 9.30 | 9.16 | 9.16 | 9.02 | 9.02 | 9.02 |
|  | wt % | 15.91 | 15.43 | 15.35 | 15.52 | 15.62 | 15.91 |
| $Ta_2O_5$ | mol % | 0.00 | 1.53 | 1.53 | 1.50 | 1.50 | 0.00 |
|  | wt % | 0.00 | 4.90 | 4.88 | 4.93 | 4.96 | 0.00 |
| $Nb_2O_5$ | mol % | 3.10 | 1.53 | 1.53 | 0.00 | 0.00 | 0.00 |
|  | wt % | 6.08 | 2.95 | 2.93 | 0.00 | 0.00 | 0.00 |
| $TiO_2$ | mol % | 3.10 | 12.21 | 9.16 | 9.02 | 15.04 | 15.04 |
|  | wt % | 1.83 | 7.09 | 5.29 | 5.35 | 8.97 | 9.13 |
| $SiO_2$ | mol % | 0.00 | 3.05 | 3.05 | 3.01 | 3.01 | 6.02 |
|  | wt % | 0.00 | 1.33 | 1.33 | 1.34 | 1.35 | 2.75 |
| $Li_2O$ | mol % | 0.00 | 0.00 | 1.53 | 0.00 | 0.00 | 1.50 |
|  | wt % | 0.00 | 0.00 | 0.33 | 0.00 | 0.00 | 0.34 |
| $Yb_2O_3$ | mol % | 0.00 | 0.00 | 0.00 | 0.00 | 0.00 | 0.00 |
|  | wt % | 0.00 | 0.00 | 0.00 | 0.00 | 0.00 | 0.00 |
| $ZrO_2$ | mol % | 0.00 | 0.00 | 3.05 | 3.01 | 0.00 | 0.00 |
|  | wt % | 0.00 | 0.00 | 2.72 | 2.75 | 0.00 | 0.00 |
| Total | mol % | 100.00 | 100.00 | 100.00 | 100.00 | 100.00 | 100.00 |
|  | wt % | 100.00 | 100.00 | 100.00 | 100.00 | 100.00 | 100.00 |
| (A)※ | mol % | 15.50 | 15.27 | 15.27 | 15.04 | 15.04 | 16.54 |
|  | wt % | 37.90 | 37.37 | 37.17 | 37.18 | 37.81 | 42.66 |
| Tg (° C.) |  | 567 | 590 | 588 | 585 | 595 | 597 |
| Ts (° C.) |  | 607 | 635 | 632 | 630 | 640 | 643 |
| nd |  | 1.8619 | 1.9022 | 1.8926 | 1.8777 | 1.8935 | 1.8844 |
| vd |  | 35.2 | 31.1 | 32.5 | 33.7 | 31.1 | 32.0 |

※(A) represents a total content of $La_2O_3$, $Gd_2O_3$, $Y_2O_3$ and $Yb_2O_3$.

TABLE 3

| | | \multicolumn{7}{c}{No.} | | | | | | |
|---|---|---|---|---|---|---|---|---|
| | | 12 | 13 | 14 | 15 | 16 | 17 | 18 |
| $B_2O_3$ | mol % | 36.43 | 35.43 | 37.60 | 39.84 | 37.01 | 36.43 | 35.43 |
| | wt % | 18.72 | 17.03 | 17.97 | 18.93 | 19.01 | 18.57 | 17.83 |
| $La_2O_3$ | mol % | 13.18 | 14.96 | 15.20 | 15.45 | 13.39 | 11.63 | 11.02 |
| | wt % | 31.68 | 33.66 | 34.00 | 34.35 | 32.17 | 27.74 | 25.96 |
| $Gd_2O_3$ | mol % | 2.33 | 3.94 | 4.00 | 4.07 | 2.36 | 2.33 | 6.30 |
| | wt % | 6.22 | 9.85 | 9.96 | 10.06 | 6.32 | 6.17 | 16.51 |
| ZnO | mol % | 32.56 | 29.92 | 27.20 | 24.39 | 29.92 | 32.56 | 26.77 |
| | wt % | 19.55 | 16.81 | 15.20 | 13.55 | 17.96 | 19.40 | 15.75 |
| $WO_3$ | mol % | 9.30 | 9.45 | 9.60 | 9.76 | 9.45 | 9.30 | 6.30 |
| | wt % | 15.91 | 15.13 | 15.28 | 15.44 | 16.16 | 15.79 | 10.56 |
| $Ta_2O_5$ | mol % | 0.00 | 0.00 | 0.00 | 0.00 | 0.00 | 0.00 | 1.57 |
| | wt % | 0.00 | 0.00 | 0.00 | 0.00 | 0.00 | 0.00 | 5.03 |
| $Nb_2O_5$ | mol % | 3.10 | 3.15 | 3.20 | 3.25 | 3.15 | 3.10 | 1.57 |
| | wt % | 6.08 | 5.78 | 5.84 | 5.90 | 6.18 | 6.04 | 3.03 |
| $TiO_2$ | mol % | 3.10 | 3.15 | 3.20 | 3.25 | 3.15 | 3.10 | 6.30 |
| | wt % | 1.83 | 1.74 | 1.75 | 1.77 | 1.86 | 1.81 | 3.64 |
| $SiO_2$ | mol % | 0.00 | 0.00 | 0.00 | 0.00 | 0.00 | 0.00 | 3.15 |
| | wt % | 0.00 | 0.00 | 0.00 | 0.00 | 0.00 | 0.00 | 1.37 |
| $Li_2O$ | mol % | 0.00 | 0.00 | 0.00 | 0.00 | 1.57 | 0.00 | 1.57 |
| | wt % | 0.00 | 0.00 | 0.00 | 0.00 | 0.35 | 0.00 | 0.34 |
| $Yb_2O_3$ | mol % | 0.00 | 0.00 | 0.00 | 0.00 | 0.00 | 1.60 | 0.00 |
| | wt % | 0.00 | 0.00 | 0.00 | 0.00 | 0.00 | 4.50 | 0.00 |
| $ZrO_2$ | mol % | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 |
| Total | mol % | 100.00 | 100.00 | 100.00 | 100.00 | 100.00 | 100.00 | 100.00 |
| | wt % | 100.00 | 100.00 | 100.00 | 100.00 | 100.00 | 100.00 | 100.00 |
| (A)* | mol % | 15.51 | 18.90 | 19.20 | 19.52 | 15.75 | 15.56 | 17.32 |
| | wt % | 37.90 | 43.51 | 43.96 | 44.41 | 38.49 | 38.41 | 42.47 |
| Tg (° C.) | | 567 | 577 | 581 | 588 | 559 | 569 | 582 |
| Ts (° C.) | | 607 | 618 | 623 | 629 | 599 | 609 | 630 |
| nd | | 1.8619 | 1.8806 | 1.8747 | 1.8691 | 1.8587 | 1.8603 | 1.8636 |
| vd | | 35.2 | 35.1 | 35.4 | 35.6 | 35.5 | 35.4 | 35.7 |

*(A) represents a total content of $La_2O_3$, $Gd_2O_3$, $Y_2O_3$ and $Yb_2O_3$.

As shown in Tables 1 to 3, all the optical glasses had predetermined refractive indexes, Abbe's numbers and glass transition temperatures, exhibited the property of being excellently softened at a low temperature and excellent meltability and were suitable as optical glasses for precision press-molding.

A refined and homogenized molten glass corresponding to any one of the above optical glasses was caused to flow out of a pipe formed of platinum that was temperature-adjusted to a temperature range in which stable flow of the glass was permitted without causing the devitrification of the glass. A molten glass gob having an intended preform weight was separated by a dropping method or a descent-separation method and received with a receiving support having a gas ejection port in a bottom thereof, and the molten glass gob was shaped into a preform while it was caused to float by ejecting a gas from the gas ejection port. Intervals at which the molten glass was separated were adjusted and set, whereby spherical preforms and compressedly spherical preforms were obtained. The weight of each preform accurately corresponded to the predetermined weight value, and each preform had a smooth surface.

Separately, further, each molten glass was cast into a mold to form a plate-like glass, and the plate like glass was annealed and then cut. The thus-obtained pieces were ground and polished to give preforms whose surfaces were all smooth.

The above-obtained preforms whose surfaces were formed by solidification of the optical glasses in a molten state and the above-obtained preforms obtained by polishing their surfaces were precision press-molded with a pressing apparatus shown in the drawing, to give aspherical lenses. Specifically, a preform 4 was placed between a lower mold member 2 and an upper mold member 1 of a press mold having the upper mold member 1, the lower mold member 2 and a sleeve member 3, and then a nitrogen atmosphere was introduced into a quartz tube 11. A heater 12 was electrically powered to heat an inside of the quartz tube 11. The temperature inside the press mold was set at a temperature at which each glass to be precision press-molded exhibited a viscosity of $10^8$ to $10^{10}$ dPa·S, and while such a temperature was maintained, a pressing rod 13 was caused to move downward to press the preform set in the mold. The pressing was carried out at a pressure of 8 MPa for 30 seconds. After the pressing, the pressing pressure was released, and while the press-molded glass product was in contact with the lower mold member 2 and the upper mold member 1, it was gradually cooled to a temperature at which the glass exhibited a viscosity of $10^{12}$ dPa·S or more. Then, the product was rapidly cooled to room temperature, and the product was taken out of the press mold, to give an aspherical lens. The thus-obtained aspherical lenses were lenses having remarkably high surface accuracy.

The aspherical lenses obtained by the precision press-molding were provided with an antireflection film as required.

The same preforms as the above preforms were precision press-molded according to another process. Specifically, in this process, a preform was preheated to a temperature at which the glass constituting the preform exhibited a viscosity of $10^8$ dPa·S while the preform was caused to float. On the other hand, a press mold having an upper mold member, a lower mold member and a sleeve member was heated up to a temperature at which the above glass exhibited a viscosity of $10^9$ to $10^{12}$ dPa·S, and the preheated preform was introduced into the cavity of the press mold to carry out precision press-molding of the preform. The pressing pressure was set at 10 MPa. Upon start of the pressing, cooling of the glass and the press mold was started, and the cooling was continued until the molded glass had a viscosity of $10^{12}$ dPa·s or more. Then, a molded product was taken out of the mold to give an aspherical lens. The thus-obtained aspherical lenses were lenses having remarkably high surface accuracy.

The aspherical lenses obtained by the precision press-molding were provided with an antireflection film as required.

In the above manner, optical elements formed of optical glasses having excellent climate resistance and having high internal quality were highly productively and highly accurately produced.

INDUSTRIAL UTILITY

According to the present invention, there can be obtained optical glasses having high-refractivity low-dispersion properties, having a low glass transition temperature and having the property of being softened at a low temperature so that a preform therefrom is precision press-moldable, and there can be produced preforms for precision press-molding and optical elements such as various lenses, and the like from the above optical glasses.

The invention claimed is:

1. An optical glass comprising, by mol %,

| | |
|---|---|
| 15-45% | $B_2O_3$, |
| 5-20% | $La_2O_3$, |
| 1-20% | $Gd_2O_3$, |
| 15-45% | ZnO, |
| 0-15% | $WO_3$, |
| 0-10% | $Ta_2O_5$, |
| 0-10% | $Nb_2O_5$, |
| 0-20% | $TiO_2$, |
| 0-20% | $SiO_2$, |
| 0-15% | $Li_2O$, |
| 0-10% | $Na_2O$, |
| 0-10% | $K_2O$, |
| 0-10% | MgO, |
| 0-10% | CaO, |
| 0-10% | SrO, |
| 0-10% | BaO |

-continued

| | |
|---|---|
| 0-8% | $Y_2O_3$, |
| 0-8% | $Yb_2O_3$, | provided that the total content of $La_2O_3$, $Gd_2O_3$, $Y_2O_3$ and $Yb_2O_3$ is 15.04 to 30%,

| | |
|---|---|
| 0-10% | $ZrO_2$, |
| 0-10% | $Bi_2O_3$, |
| 0-1% | $GeO_2$, and |
| 0-1% | $Sb_2O_3$, | and having a refractive index (nd) of over 1.86, an Abbe's number (vd) of less than 35 and a glass transition temperature (Tg) of 630° C. or lower.

2. A precision press-molding preform, which is formed of the optical glass recited in claim 1.

3. A process for the production of a precision press-molding preform, which comprises separating a molten glass gob having a predetermined weight from a molten glass flowing out of a pipe, and shaping the glass gob into a preform formed of the optical glass recited in claim 1.

4. A process for the production of a precision press-molding preform, which comprises forming a shaped glass from a molten glass and processing said shaped glass to produce a preform formed of the optical glass recited in claim 1.

5. An optical element formed of the optical glass recited in claim 1.

6. A process for the production of an optical element, which comprises heating the preform recited in claim 2 and precision press-molding the preform.

7. A process for the production of an optical element, which comprises heating the preform produced by the process recited in claim 3 and precision press-molding the preform.

8. The process for the production of an optical element as recited in claim 6, wherein a press mold and the preform are heated together and the preform is precision press-molded with said press mold.

9. The process for the production of an optical element as recited in claim 6, wherein the preform pre-heated separately from a press mold is introduced into the press mold pre-heated, and the preform is precision press-molded.

* * * * *